United States Patent
Yokoyama et al.

(10) Patent No.: US 10,199,624 B2
(45) Date of Patent: Feb. 5, 2019

(54) LAYERED DOUBLE HYDROXIDE-CONTAINING COMPOSITE MATERIAL

(71) Applicant: NGK INSULATORS, LTD., Nagoya-Shi (JP)

(72) Inventors: Shohei Yokoyama, Nagoya (JP); Megumi Fujisaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/468,537

(22) Filed: Mar. 24, 2017

(65) Prior Publication Data

US 2017/0194614 A1 Jul. 6, 2017

Related U.S. Application Data

(63) Continuation of application No. PCT/JP2015/078655, filed on Oct. 8, 2015.

(30) Foreign Application Priority Data

Oct. 28, 2014 (JP) .................................. 2014-219757
Jul. 24, 2015 (JP) .................................. 2015-146893

(51) Int. Cl.
*H01M 2/16* (2006.01)
*B32B 9/00* (2006.01)
(Continued)

(52) U.S. Cl.
CPC ............. *H01M 2/1686* (2013.01); *B32B 9/00* (2013.01); *B32B 18/00* (2013.01); *C01F 7/00* (2013.01);
(Continued)

(58) Field of Classification Search
CPC .. H01M 2/216; H01M 2/1686; H01M 2/1646; B32B 9/00; B32B 18/00;
(Continued)

(56) References Cited

U.S. PATENT DOCUMENTS

2004/0059037 A1* 3/2004 Wang ....................... C08J 3/205
                                                              524/445
2013/0189580 A1* 7/2013 Dai .......................... H05K 3/30
                                                              429/221
(Continued)

FOREIGN PATENT DOCUMENTS

CN      1333113 C        8/2007
EP      2 942 327 A1    11/2015
(Continued)

OTHER PUBLICATIONS

Lu et all Chemical Engineering Science 62 (2007) 6069-6075.*

(Continued)

*Primary Examiner* — Alexander Usyatinsky

(74) *Attorney, Agent, or Firm* — Burr & Brown, PLLC

(57) ABSTRACT

Provided is a layered-double-hydroxide-containing composite material including a porous substrate and a functional layer disposed on and/or in the porous substrate, the functional layer containing a layered double hydroxide represented by the formula $M^{2+}_{1-x}M^{3+}_{x}(OH)_2A^{n-}_{x/n}\cdot mH_2O$, where $M^{2+}$ represents a divalent cation, $M^{3+}$ represents a trivalent cation, $A^{n-}$ represents an n-valent anion, n is an integer of 1 or more, and x is 0.1 to 0.4, and the functional layer further containing sulfur (S) at the interface between the functional layer and the porous substrate and in the vicinity of the interface. In the LDH-containing composite material of the present invention, the LDH-containing functional layer disposed on and/or in the porous substrate exhibits significantly improved conductivity.

11 Claims, 9 Drawing Sheets

(51) Int. Cl.
*B32B 18/00* (2006.01)
*C01F 7/00* (2006.01)
*C04B 35/03* (2006.01)
*C04B 35/057* (2006.01)
*C04B 35/10* (2006.01)
*C04B 35/18* (2006.01)
*C04B 35/185* (2006.01)
*C04B 35/195* (2006.01)
*C04B 35/26* (2006.01)
*C04B 35/453* (2006.01)
*C04B 35/46* (2006.01)
*C04B 35/48* (2006.01)
*C04B 35/565* (2006.01)
*C04B 38/00* (2006.01)

(52) U.S. Cl.
CPC .............. *C01F 7/005* (2013.01); *C04B 35/03* (2013.01); *C04B 35/057* (2013.01); *C04B 35/10* (2013.01); *C04B 35/18* (2013.01); *C04B 35/185* (2013.01); *C04B 35/195* (2013.01); *C04B 35/26* (2013.01); *C04B 35/453* (2013.01); *C04B 35/46* (2013.01); *C04B 35/48* (2013.01); *C04B 35/565* (2013.01); *C04B 38/00* (2013.01); *H01M 2/1646* (2013.01); *C01P 2004/03* (2013.01); *C04B 2235/3218* (2013.01)

(58) Field of Classification Search
CPC ....... C04B 38/00; C04B 35/565; C04B 35/48; C04B 35/46; C04B 35/453; C04B 35/26; C04B 35/03; C04B 35/18; C04B 35/185; C04B 35/195; C04B 38/0054; C04B 38/007; C04B 2235/3218; C01F 7/00; C01F 7/005; C01P 2004/03
See application file for complete search history.

(56) References Cited

U.S. PATENT DOCUMENTS

| 2014/0227616 | A1* | 8/2014 | Yamada | ................ | H01M 12/08 |
| | | | | | 429/406 |
| 2014/0315099 | A1* | 10/2014 | Yamada | ................ | H01M 10/24 |
| | | | | | 429/304 |
| 2015/0340680 | A1 | 11/2015 | Fujisaki et al. | | |
| 2016/0141582 | A1 | 5/2016 | Fujisaki et al. | | |

FOREIGN PATENT DOCUMENTS

| EP | 3 015 430 A1 | | 5/2016 |
| JP | 2013-191523 A | | 9/2013 |
| JP | 2013191523 | * | 9/2013 |
| WO | 2006/050648 A1 | | 5/2006 |
| WO | WO2013/073292 | * | 5/2013 |
| WO | 2013/118561 A1 | | 8/2013 |
| WO | WO 2013/118561 | * | 8/2013 |
| WO | 2015/098610 A1 | | 7/2015 |
| WO | 2015/098612 A1 | | 7/2015 |

OTHER PUBLICATIONS

International Search Report and Written Opinion (with English Translation), International Application No. PCT/JP2015/078655, dated Nov. 10, 2015 (16 pages).

Lü, et al. "Microstructure-controlled synthesis of oriented layered double hydroxide thin films: Effect of varying the preparation conditions and a kinetic and mechanistic study of film formation," *Chemical Engineering Science*, vol. 62, dated 2007, pp. 6069-6075 (7 pages).

Liao, et al. "Fabrication of high-performance facilitated transport membranes for $CO_2$ separation," Chemical Science, vol. 5, dated 2014, pp. 2843-2849 (7 pages).

Lei, et al. "Synthesis of Oriented Layered Double Hydroxide Thin Films on Sulfonated Polystyrene Substrates," *Chemistry Letters*, vol. 34, No. 12, dated 2005, pp. 1610-1611 (2 pages).

Extended European Search Report, European Application No. 15854191.2, dated Apr. 3, 2018 (10 pages).

* cited by examiner

LAYERED DOUBLE HYDROXIDE-CONTAINING COMPOSITE MATERIAL

CROSS-REFERENCE TO RELATED APPLICATIONS

This application is a continuation application of PCT/JP2015/078655 filed Oct. 8, 2015, which claims priority to Japanese Patent Application No. 2014-219757 filed Oct. 28, 2014 and Japanese Patent Application No. 2015-146893 filed Jul. 24, 2015, the entire contents all of which are incorporated herein by reference.

BACKGROUND OF THE INVENTION

1. Field of the Invention

The present invention relates to a layered-double-hydroxide-containing composite material.

2. Description of the Related Art

Layered double hydroxides (hereinafter also referred to as LDHs), such as hydrotalcite, are compounds that contain exchangeable anions between hydroxide layers. To make use of their characteristics, LDHs have been used as catalysts and absorbents, as well as dispersants in polymers in order to improve heat resistance of the polymers. In particular, LDHs have recently been attracting attention as materials that exhibits hydroxide ion conductivity, and studied for use as electrolytes in alkaline fuel cells or additives in catalytic layers of zinc-air batteries.

Their traditional uses, such as catalysts, require high specific surface area, and thus it was sufficient to synthesize and use LDH powder. Meanwhile, in uses such as electrolytes in, for example, alkaline fuel cells making use of hydroxide ion conductivity, a high-density LDH membrane is desirable in order to prevent fuel gas from admixing and ensure sufficient electromotive force.

Patent Documents 1 and 2 and Non-Patent Document 1 disclose oriented LDH membranes. These oriented LDH membranes are produced by horizontally suspending the surface of a polymer substrate in a solution that contains urea and a metal salt to cause nucleation and oriented growth of LDH. The oriented LDH membranes of these Documents each show a strong peak of (003) plane in the X-ray diffraction pattern.

CITATION LIST

Patent Documents

Patent Document 1: CNC1333113
Patent Document 2: WO2006/050648

Non-Patent Document

Non-Patent Document 1: Zhi Lu, *Chemical Engineering Science*, 62, pp. 6069-6075(2007), "Microstructure-controlled synthesis of oriented layered double hydroxide thin films: Effect of varying the preparation conditions and a kinetic and mechanistic study of film formation"

SUMMARY OF THE INVENTION

The present inventors have in advance successfully produced an LDH dense bulk block (hereinafter referred to as an LDH dense body). In addition, an experiment on hydroxide ion conductivity of the LDH dense body has revealed that the LDH dense body exhibits a high ion conductivity along the layers of LDH particles. Unfortunately, for the purpose of using LDH for solid electrolyte separators of alkaline secondary batteries, e.g., zinc-air batteries and nickel-zinc batteries, the LDH dense body is inadequate due to its high resistivity. For this use of LDH, it is needed to produce a thin LDH membrane that exhibits low resistivity. In this respect, the oriented LDH membranes disclosed in Patent Documents 1 and 2 and Non-Patent Document 1 are inadequate in view of their LDH orientations and density. Hence, a high density LDH membrane, preferably an oriented LDH membrane, is desired. Use of such an LDH membrane as a solid electrolyte separator further requires a porous substrate for supporting the LDH membrane to facilitate movement of hydroxide ions in the electrolyte solution through the LDH membrane.

The present inventors have found that an LDH-containing functional layer (e.g., an LDH membrane) disposed on and/or in a porous substrate can exhibit significantly improved conductivity in the presence of sulfur (S) at the interface between the LDH-containing functional layer and the porous substrate and in the vicinity of the interface.

An object of the present invention is to provide an LDH-containing composite material comprising a porous substrate and an LDH-containing functional layer disposed on and/or in the porous substrate, the LDH-containing functional layer exhibiting significantly improved conductivity.

According to an aspect of the present invention, there is provided a layered-double-hydroxide-containing composite material comprising:

a porous substrate; and a water impermeable functional layer on and/or in the porous substrate, the functional layer containing a layered double hydroxide represented by general formula $M^{2+}_{1-x}M^{3+}_{x}(OH)_2A^{n-}_{x/n} \cdot mH_2O$, where $M^{2+}$ represents a divalent cation, $M^{3+}$ represents a trivalent cation, $A^{n-}$ represents an n-valent anion, n represents an integer not less than 1, x represents a value of 0.1 to 0.4, and m represents any real number, and the functional layer further containing sulfur (S) at the interface between the functional layer and the porous substrate and in the vicinity of the interface.

According to another aspect of the present invention, there is provided a battery comprising a separator comprising the layered-double-hydroxide-containing composite material according to the above aspect.

DETAILED DESCRIPTION OF THE INVENTION

Layered-Double-Hydroxide-Containing Composite Material

A layered-double-hydroxide-containing composite material (or an LDH-containing composite material) of the present invention comprises a porous substrate and a functional layer that is formed on and/or in the porous substrate. The functional layer contains layered double hydroxide (LDH) represented by the general formula $M^{2+}_{1-x}M^{3+}_{x}(OH)_2A^{n-}_{x/n} \cdot mH_2O$, where $M^{2+}$ represents a divalent cation, $M^{3+}$ represents a trivalent cation, $A^{n-}$ represents an n-valent anion, n represents an integer not less than 1, x represents a value of 0.1 to 0.4). The functional layer is preferably composed mainly of such an LDH. The functional layer further contains sulfur (S) at the interface between the functional layer and the porous substrate and in the vicinity of the interface. Sulfur (S) may be present in any form that can be detected by elemental analysis. Thus, the LDH-containing functional layer exhibits significantly improved conductivity in the presence of sulfur (S) at the interface between the functional layer and the porous substrate and in the vicinity of the interface. As described above, the practical application of an LDH requires formation of a thin LDH film for a reduction in resistance. The present invention can provide an LDH-containing composite material comprising an LDH-containing functional layer of desirably low resistance. Thus, the present invention is advantageous in that an LDH is applied to a solid electrolyte separator for use in an alkaline secondary battery, such as a zinc-air battery or a nickel-zinc battery.

Figure 1:
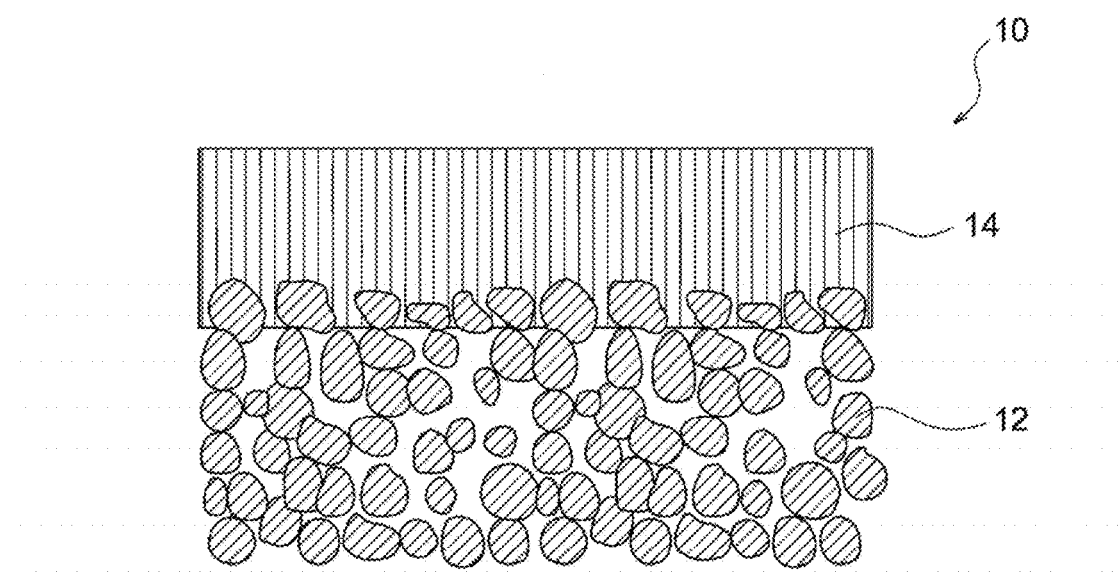
FIG. 1 is a schematic cross-sectional view of an LDH-containing composite material according to an embodiment of the present invention.

The porous substrate, which has pores, can exhibit water permeability, whereas the functional layer is typically a dense layer. Preferably, the functional layer is composed of a highly-densified LDH and exhibits water impermeability. As used herein, the term "water impermeability" of an analyte (e.g., the functional layer and/or the porous substrate) indicates that water in contact with one surface of the analyte does not reach the other surface during the "density evaluation test I" performed in Examples described below or any other equivalent method or system. Preferably, the functional layer is formed on the porous substrate. With reference to FIG. 1, a functional layer 14 as an LDH dense membrane is formed preferably on a porous substrate 12 in an LDH-containing composite material 10, for example. It should be noted that the porous substrate 12 allows LDH to be formed in pores in the surface and its vicinity of the porous substrate 12 as shown in FIG. 1. Alternatively, as in the case of an LDH-containing composite material 10' shown in FIG. 2, high density LDH may be formed in the porous substrate 12 (for example, in pores in the surface and its vicinity of the porous substrate 12), whereby at least a portion of the porous substrate 12 may constitute a functional layer 14'. The composite material 10' shown in FIG. 2 lacks a pure membrane portion of the functional layer 14 of the composite material 10 in FIG. 1. Alternatively, the functional layer 14' may have any other structure parallel to the surface of the porous substrate 12. If the functional layer is composed of a highly-densified LDH and exhibits water impermeability in the LDH-containing composite material of the present invention, the composite material can have a unique function; i.e., both hydroxide ion conductivity and water impermeability.

As described above, the LDH-containing composite material of the present invention has the porous substrate which exhibits water permeability and, nevertheless, preferably has the dense functional layer which exhibits water impermeability (desirably both water impermeability and gas impermeability). Hence, the LDH-containing composite material of the present invention as a whole exhibits hydroxide ion conductivity but exhibits water impermeability, and thus can function as a separator of a battery. LDH dense bulk blocks are not suitable for solid electrolyte separators of batteries due to their high resistivity, as described above. In contrast, the functional layer of the composite material of the present invention can be thin and have low resistivity by virtue of the porous substrate which gives strength to the composite material of the present invention. In addition, the porous substrate may exhibit water permeability, whereby the electrolyte solution can come into contact with the LDH-containing functional layer when the composite material of the present invention is used as a solid electrolyte separator of a battery. That is, the LDH-containing composite material of the present invention is very useful as a material of a solid electrolyte separator of various batteries, such as metal-air batteries (e.g., zinc-air batteries) and other zinc secondary batteries (e.g., nickel-zinc batteries).

Preferably, the porous substrate in the composite material of the present invention is one on and/or in which the LDH-containing functional layer can be formed. The porous substrate may be composed of any material and may have any porous structure. In a typical embodiment, the LDH-containing functional layer is formed on and/or in the porous substrate. Alternatively, the LDH-containing functional layer may be formed on a non-porous substrate, and then the non-porous substrate may be modified into a porous form by any known method. In each embodiment, the porous substrate preferably has a porous structure that give water permeability to the porous substrate because, by virtue of such a porous structure, an electrolyte solution can come into contact with the functional layer in the case where the composite material is used as a separator of a battery.

The porous substrate is preferably composed of at least one selected from the group consisting of ceramics, metals and polymers. More preferably, the porous substrate is composed of a ceramic. Preferred examples of the ceramics include alumina, zirconia, titania, magnesia, spinel, calcia, cordierite, zeolite, mullite, ferrite, zinc oxide, silicon carbide, and a combination thereof. Alumina, zirconia, titania, and a combination thereof are more preferred. Alumina, zirconia (e.g., yttria-stabilized zirconia (YSZ)), and a combination thereof are further preferred. Use of these porous ceramic facilitates formation of a high density LDH-containing functional layer. Preferred examples of the metals include aluminum and zinc. Preferred examples of the polymers include polystyrene, polyether sulfone, polypropylene, epoxy resins, polyphenylene sulfide, hydrophilized fluororesins (e.g., poly(tetrafluoroethylene) (PTFE)), and a combination thereof. The preferred materials described above all have alkali resistance, in other words, resistance to an electrolyte solution of a battery.

The porous substrate has an average pore diameter of preferably from 0.001 to 1.5 μm, more preferably from 0.001 to 1.25 μm, still more preferably from 0.001 to 1.0 μm, particularly preferably from 0.001 to 0.75 μm, and most preferably from 0.001 to 0.5 μm. These ranges make it possible to form a dense LDH-containing functional layer exhibiting water impermeability while ensuring desired water permeability in the porous substrate and desired strength as a support. In the present invention, the average pore diameter can be measured by measuring the longest diameter of each pore in an electron microscopic image of the surface of the porous substrate. The magnification of the electron microscopic image used in this measurement is not less than 20,000. All of the measured pore diameters are listed in the ascending order from the shortest one to calculate the average, from which the subsequent 15 larger diameters and the subsequent 15 smaller diameters, i.e., 30 diameters in total, are selected in one field of view. Subsequently, the selected diameters of two fields of view are averaged to obtain the average pore diameter. The diameters can be measured by, for example, a length-measuring function of a SEM or an image analysis software (e.g., Photoshop, Adobe).

The surface of the porous substrate has a porosity of preferably from 10 to 60%, more preferably from 15 to 55%, and further more preferably from 20 to 50%. These ranges make it possible to form a dense LDH-containing functional layer that exhibits water impermeability while ensuring desired water permeability of the porous substrate and desired strength as a support. The surface porosity of the porous substrate is adopted because it can readily be measured by image processing described below and substantially reflects the internal porosity of the porous substrate. In other words, if the surface of the porous substrate is dense, the inside of the porous substrate is dense, too. In the present invention, the porosity at the surface of the porous substrate can be measured by a method involving image processing, in accordance with the following procedures: 1) an electron microscopic (SEM) image of the surface of the porous substrate is taken at a magnification of not less than 10,000; 2) the grayscale SEM image is read with an image analysis software, such as Photoshop (Adobe); 3) a monochromatic binary image is generated with tools named [image], [color compensation] and [binarization] in this order; and 4) the porosity (%) is calculated by dividing the number of pixels of the black area(s) by the number of the pixels of the whole image. Preferably, the porosity is measured over a 6 μm×6 μm area of the surface of the porous substrate by image processing. More preferably, the porosity is determined by averaging the porosity in three 6 μm×6 μm areas selected at random for objective evaluation.

The functional layer in the composite material of the present invention comprises a layered double hydroxide (LDH) represented by the general formula $M^{2+}_{1-x}M^{3+}_{x}(OH)_2A^{n-}_{x/n} \cdot mH_2O$ (where $M^{2+}$ represents a divalent cation, $M^{3+}$ represents a trivalent cation, $A^{n-}$ represents an n-valent anion, n represents an integer not less than 1, x represents a value of 0.1 to 0.4, and m represents any real number). In addition, the functional layer exhibits water impermeability. In the general formula, $M^{2+}$ may represent any divalent cation; preferably, $M^{2+}$ represents, for example, $Mg^{2+}$, $Ca^{2+}$ and/or $Zn^{2+}$, and more preferably $Mg^{2+}$. $M^{3+}$ may represent any trivalent cation; preferably, $M^{3+}$ represents, for example, $Al^{3+}$ and/or $Cr^{3+}$, and more preferably $Al^{3+}$. $A^{n-}$ may represent any anion, and preferably, for example, $OH^-$ and/or $CO_3^{2-}$. Hence, it is preferable that, in the general formula, $M^{2+}$ comprises $Mg^{2+}$, $M^{3+}$ comprises $Al^{3+}$, and $A^{n-}$ comprises $OH^-$ and/or $CO_3^{2-}$. In the general formula, n represents an integer not less than 1, and preferably 1 or 2; x represents a value of 0.1 to 0.4, and preferably 0.2 to 0.35; and m represents any real number. Specifically, m represents a value not less than 0, and more preferably a real number or an integer more than 0 or not less than 1.

As described above, the functional layer further contains sulfur (S) at the interface between the functional layer and the porous substrate and in the vicinity of the interface. The incorporation of S leads to an increase in conductivity. The sulfur content at the interface between the functional layer and the porous substrate and in the vicinity of the interface is preferably 0.01 atom % or more, more preferably 0.05 to 5.0 atom %, still more preferably 0.1 to 2.0 atom %, particularly preferably 0.2 to 1.0 atom %. The sulfur (S) content can be determined by EDS compositional analysis (cross-sectional EDS point analysis) at the interface between the functional layer and the porous substrate and in the vicinity of the interface. In detail, the S content is preferably determined as described below. A cross section of a composite material sample (including a functional layer and a porous substrate) is polished with a cross section polisher (CP) for observation of the polished surface. Cross-sectional images of the composite material sample are observed with an FE-SEM at a magnification of 15,000 or more (three visual fields). Compositional analysis (point analysis) is performed at any three points at the interface between the LDH membrane and the porous substrate of each of the three visual-field images (i.e., nine points in total) with an EDS analyzer (accelerating voltage: 10 kV, acquisition time: 100 seconds). The S content (atom %) at each point is determined by the compositional analysis, and the S contents at the nine points are averaged. The average value is defined as the S content at the interface. In general, the EDS compositional analysis targeted for the interface may acquire some data in the vicinity of the interface; i.e., data in a region several μm distant from the analyzed point. Thus, the expression "the interface and in the vicinity of the interface" used herein generally refers to the interface itself, and can also include a region several μm or less distant from the interface (e.g., a region 0.5 or less distant from the interface) in which incidental data are acquired by the EDS compositional analysis targeted for the interface.

The functional layer may further contain carbon (C) at the interface between the functional layer and the porous substrate and in the vicinity of the interface. The incorporation of C leads to a further increase in conductivity. The maximum carbon content (i.e., carbon (C) atom content) at the interface between the functional layer and the porous substrate and in the vicinity of the interface is preferably 10 atom % or more, more preferably 20 atom % or more, still more preferably 30 atom % or more, particularly preferably 50 atom % or more. The maximum carbon content may be 100 atom % and is typically 80 atom % or less. The carbon (C) content can be determined by EDS compositional analysis (acquisition of a line profile of carbon concentration by cross-sectional EDS) at the interface between the functional layer and the porous substrate and in the vicinity of the interface. In detail, the C content is preferably determined as described below. A cross section of a composite material sample (including a functional layer and a porous substrate) is polished with a cross section polisher (CP) for observation of the polished surface. A cross-sectional image of the composite material sample (including the LDH membrane and the porous substrate) is observed with an FE-SEM at a magnification of 10,000 or more (refer to, for example, the image illustrated in FIG. 12). The image is analyzed with an EDS analyzer (accelerating voltage: 5 kV) to acquire a line profile of carbon concentration (i.e., carbon atom C concentration (atom %)) across the interface between the LDH membrane and the porous substrate at a predetermined pitch (e.g., 0.06 μm) over a length of 3 μm from the LDH membrane toward the porous substrate, for example, as shown by the dotted arrow in FIG. 12. The resultant line profile of carbon concentration is used to determine the presence of the maximum carbon content at the interface and in the vicinity thereof. Since the maximum carbon content at the interface and in the vicinity thereof is apparently not affected by inevitable intrusion of carbon due to contamination with, for example, external air during the analysis, the presence of the maximum carbon content is the objective evidence for the presence of carbon (C) at the interface and in the vicinity thereof. In general, the EDS compositional analysis targeted for the interface may acquire some data in the vicinity of the interface; i.e., data in a region several μm distant from the analyzed point. Thus, the expression "the interface and in the vicinity of the interface" used herein generally refers to the interface itself, and can also include a region several or less distant from the interface (e.g., a region 0.5 μm or less distant from the interface) in which incidental data are acquired by the EDS compositional analysis targeted for the interface.

Figure 2:
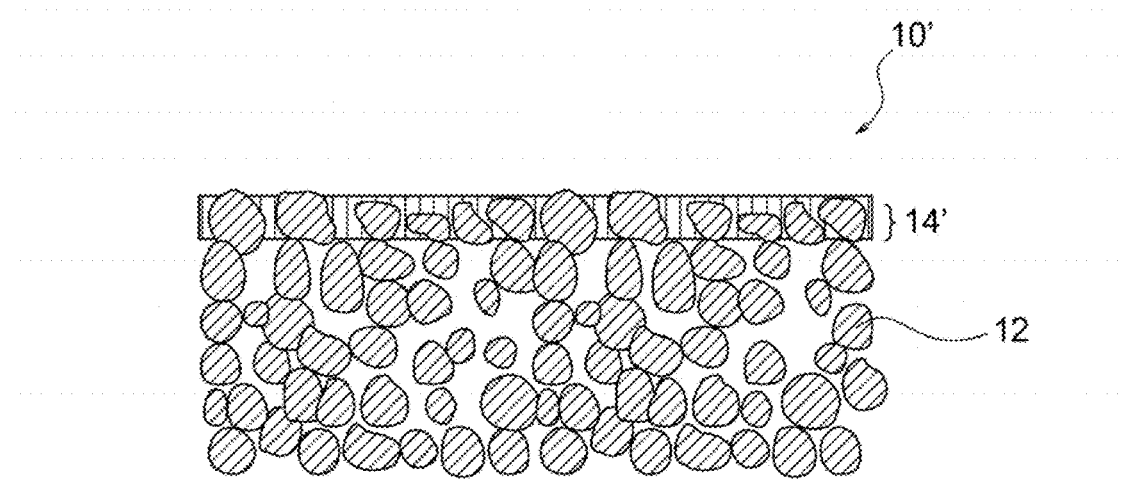
FIG. 2 is a schematic cross-sectional view of an LDH-containing composite material according to another embodiment of the present invention.

The functional layer is formed on and/or in the porous substrate, and preferably on the porous substrate. In an embodiment as shown in FIG. 1 where the functional layer 14 is formed on the porous substrate 12, the functional layer 14 is an LDH dense membrane. Typically, this LDH dense membrane consists of LDH. In an embodiment as shown in FIG. 2 where the functional layer 14' is formed in the porous substrate 12, high density LDH is formed in the porous substrate 12 (typically in pores in the surface and its vicinity of the porous substrate 12), whereby the functional layer 14' is composed of at least a portion of the porous substrate 12 and LDH. The composite material 10' and the functional layer 14' shown in FIG. 2 can be produced by removing the pure membrane portion of the functional layer 14 from the composite material 10 shown in FIG. 1 by polishing, grinding or any other known method.

The functional layer preferably exhibits water impermeability (desirably both water impermeability and gas impermeability). For example, the functional layer does not let water pass through the surface for a week during which this surface is in contact with the water at 25° C. In other words, the functional layer is preferably composed of high density LDH and exhibits water impermeability. If local and/or incidental defects that exhibit water permeability are present in or on the functional layer, such defects may be filled with an adequate repairing material (e.g., an epoxy resin) to achieve water impermeability. Such a putty does not necessarily exhibit hydroxide ion conductivity.

The layered double hydroxide is composed of an agglomeration of platy particles (i.e., platy LDH particles). Preferably, these platy particles are oriented in such a manner that the tabular faces of the platy particles are substantially perpendicular to or oblique to the surface of the porous substrate (i.e., the substrate surface). This embodiment can be preferably attained especially when the functional layer 14 is formed as an LDH dense membrane on the porous substrate 12 to form the LDH-containing composite material 10 as shown in FIG. 1. This embodiment can also be attained when high density LDH is formed in the porous substrate 12 (typically, in pores in the surface and its vicinity of the porous substrate 12), whereby at least a portion of the porous substrate 12 constitutes the functional layer 14' as in the LDH composite material 10' shown in FIG. 2.

Figure 3:
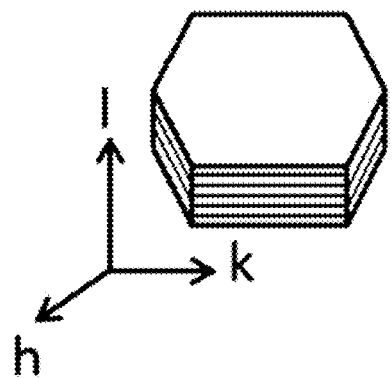
FIG. 3 is a schematic diagram of a platy particle of layered double hydroxide (LDH).

It is known that the LDH crystal has a form of a platy particle with a layered structure as shown in FIG. 3. The substantially perpendicular or oblique orientation described above is significantly beneficial for the LDH-containing functional layer (e.g., the LDH dense membrane), because an oriented LDH-containing functional layer (e.g., an oriented LDH dense membrane) exhibits anisotropic hydroxide ion conductivity, i.e., hydroxide ion conductivity along the orientation of the platy LDH particles (i.e., parallel to layers of LDH) is much greater than hydroxide ion conductivity perpendicular to the orientation of the platy LDH particles in the oriented-LDH-containing functional layer. In fact, the present inventors have revealed that, the hydroxide ion conductivity (S/cm) along the orientation of LDH particles in an oriented LDH bulk body is an order of magnitude greater than the hydroxide ion conductivity (S/cm) perpendicular to the orientation of LDH particles. Thus, the substantially perpendicular or oblique orientation in the LDH-containing functional layer of the present invention fully or significantly educes the anisotropic hydroxide ion conductivity of the oriented LDH to the thickness direction of the layer (i.e., the direction perpendicular to the surface of the functional layer or the surface of the porous substrate), whereby the conductivity along the thickness direction can be maximally or significantly increased. In addition, the LDH-containing functional layer of the present invention exhibits lower resistivity than an LDH bulk block by virtue of its layered shape. The LDH-containing functional layer with such an orientation readily conducts hydroxide ions along the thickness direction of the layer. Since the LDH-containing functional layer has high density, it is significantly appropriate for use in a functional layer that requires high conductivity across the thickness of the layer and high density, such as a separator of a battery (e.g., a hydroxide ion conductive separator of a zinc-air battery).

In a particularly preferred embodiment, the LDH-containing functional layer (typically the LDH dense membrane) should be composed of the platy LDH particles highly oriented in the substantially perpendicular direction. If the platy LDH particles are highly orientated in the substantially perpendicular direction, X-ray diffractometry of the surface of the functional layer shows no peak of (003) plane or a peak of (003) plane smaller than that of (012) plane (note that this shall not apply to the case where the porous substrate shows a peak at the same angle as a peak of (012) plane of the platy LDH particles, because a peak of (012) plane of the platy LDH particles cannot be distinguished). This characteristic peak profile indicates that the platy LDH particles of the functional layer are oriented substantially perpendicular to (i.e, perpendicular to or nearly perpendicular to, and preferably perpendicular to) the functional layer. The peak of (003) plane is strongest among peaks observed in X-ray diffractometry of non-oriented LDH powder. In contrast, the oriented LDH-containing functional layer shows no peak of (003) plane or a peak of (003) plane smaller than a peak of (012) plane because platy LDH particles are oriented substantially perpendicular to the functional layer. This can be explained as follows: The c planes (00l) including the (003) plane (note that I is 3 or 6) are parallel to the layers of platy LDH particles. If the platy LDH particles are oriented substantially perpendicular to the functional layer, the layers of platy LDH particles are also perpendicular to the functional layer and thus the X-ray diffractometry of the surface of the functional layer shows no peak or hardly shows a peak of (00l) plane. The peak of (003) plane is often stronger, if present, than the peak of (006) plane, and use of the peak of (003) plane can more readily confirm the substantially perpendicular orientation than use of the peak of (006) plane. Hence, the oriented LDH-containing functional layer preferably shows no or substantially no peak of (003) plane or shows a peak of (003) plane smaller than a peak of (012) plane, which indicates that the highly perpendicular orientation is achieved. In contrast, oriented LDH membranes of Patent Documents 1 and 2 and Non-Patent Document 1 each show a strong peak of (003) plane, which indicates that the substantially perpendicular orientation is not satisfactorily achieved. In addition, the membranes of these Documents are not dense.

The thickness of the functional layer is preferably not more than 100 μm, more preferably not more than 75 μm, still more preferably not more than 50 μm, further more preferably not more than 25 μm, and most preferably not more than 5 μm. The thin functional layers having such a thinness exhibits low resistivity. The functional layer is preferably formed on the porous substrate as the LDH dense membrane. In this case, the thickness of the functional layer is the thickness of the LDH dense membrane. In the case where the functional layer is formed in the porous substrate, the thickness of the functional layer is the thickness of a composite layer composed of at least a portion of the porous substrate and LDH. In the case where the functional layer is formed on and in the porous substrate, the thickness of the functional layer is the sum of the thickness of the LDH dense membrane and the thickness of the composite layer. In each embodiment, the thickness of the functional layer having the above thinness exhibits low resistivity desirable for use in, for example, a battery. The thickness of the oriented LDH-containing functional layer does not have a lower limit, which depends on its use. In order to ensure hardness desirable for use in a functional layer, such as a separator, the thickness is preferably not less than 1 μm, and more preferably not less than 2 μm.

Production of Layered-Double-Hydroxide-Containing Composite Material

The layered-double-hydroxide-containing composite material (LDH-containing composite material) can be produced by: (1) preparing a porous substrate; (2) depositing sulfur (S) on the porous substrate, (3) soaking the porous substrate in an aqueous stock solution that contains magnesium ions ($Mg^{2+}$) and aluminum ions ($Al^{3+}$) in a total concentration of 0.20 to 0.40 mol/L and urea; and (4) hydrothermally treating the porous substrate in the aqueous stock solution to form a layered-double-hydroxide-containing functional layer on and/or in the porous substrate.

(1) Preparation of Porous Substrate

The porous substrate is one as described above. Preferably, the porous substrate is composed of at least one selected from the group consisting of ceramics, metals, and polymers. More preferably, the porous substrate is composed of a ceramic. Preferred examples of the ceramics include alumina, zirconia, titania, magnesia, spinel, calcia, cordierite, zeolite, mullite, ferrite, zinc oxide, silicon carbide, and a combination thereof. Alumina, zirconia, titania and a combination thereof are more preferred. Alumina and zirconia are further preferred, and alumina is most preferred. Use of these porous ceramic facilitates the formation of the high density LDH-containing functional layer. In the case of a ceramic porous substrate, the porous substrate is preferably cleaned, for example, by ultrasonic cleaning or with ion-exchanged water.

As described above, the porous substrate is more preferably composed of a ceramic material. The ceramic porous substrate may be a commercially available one or may be prepared by any known process. For example, the ceramic porous substrate may be prepared as follows: Ceramic powder (e.g., zirconia powder, boehmite powder, or titania powder), methyl cellulose, and deionized water are mixed in predetermined proportions; the resultant mixture is subjected to extrusion molding; the molded product is dried at 70 to 200° C. for 10 to 40 hours; and the dried product is fired at 900 to 1,300° C. for one to five hours. The amount of methyl cellulose is preferably 1 to 20 parts by weight relative to 100 parts by weight of the ceramic powder. The amount of deionized water is preferably 10 to 100 parts by weight relative to 100 parts by weight of the ceramic powder.

The porous substrate may be composed of a polymer material. In this case, a sulfonatable polymer substrate is preferably provided because such a substrate is suitable for the subsequent step of sulfur deposition. The sulfonatable polymer substrate preferably has alkali resistance, i.e., resistance to an electrolyte solution of a battery. The sulfonatable polymer substrate is preferably composed of at least one selected from the group consisting of polystyrene, polyether sulfone, polypropylene, epoxy resins, polyphenylene sulfide, hydrophilized fluororesins (e.g., poly(tetrafluoroethylene) (PTFE)). Aromatic polymer substrates are particularly preferred because they are readily sulfonated. Examples of the aromatic polymer substrates include substrates composed of at least one selected from the group consisting of polystyrene, polyether sulfone, polypropylene, an epoxy resin, and polyphenylene sulfide. Most preferably, the aromatic polymer substrate is composed of polystyrene.

(2) Deposition of Sulfur (S)

Sulfur (S) may be deposited on the porous substrate by any process, but is preferably deposited by sulfonation. The sulfonation may be performed by soaking a sulfonatable substrate or a substrate whose surface has been treated to be sulfonatable in an acid for sulfonating the sulfonatable substrate or surface, such as sulfuric acid (e.g., concentrated sulfuric acid), fuming sulfuric acid, chlorosulfuric acid, and sulfuric anhydride. Any other sulfonation techniques may also be used. The soaking in an acid for the sulfonation may be performed at room temperature or high temperature (e.g., 50 to 150° C.). The soaking may be performed for any period of time (e.g., 1 to 14 days). The sulfonatable substrate is preferably, for example, a polymer substrate. The sulfonatable polymer substrate is as described above. If the porous substrate is unsulfonatable or unsuitable for sulfonation (e.g., a ceramic substrate), the porous substrate may be subjected to surface treatment such that the substrate can be sulfonated as in the aforementioned sulfonatable substrate. The surface treatment preferably involves deposition of a polymer on the substrate. The polymer is preferably a polymer material similar to that used for the aforementioned sulfonatable polymer substrate. The deposition of the polymer on the substrate preferably involves application of a polymer solution to the surface of the substrate. The polymer solution can be readily prepared by, for example, dissolution of a solid polymer (e.g., a polystyrene substrate) in an organic solvent (e.g., xylene). For even coating of the porous substrate with the polymer, the polymer solution is preferably applied to the substrate such that the solution does not permeate the substrate. Thus, spin coating is preferably used for very even deposition or application of the polymer solution. The spin coating may be performed under any conditions; for example, a rotation rate of 1,000 to 10,000 rpm and an operational period of about 60 to 300 seconds (including dropwise addition and drying).

In another preferred embodiment, sulfur (S) is deposited on the porous substrate after the deposition of carbon (C) on the porous substrate. In this case, preferably, carbon (typically a carbon membrane or layer) is deposited on the surface of the porous substrate and then the aforementioned sulfonation is performed on the carbon-deposited surface (typically the surface of the carbon membrane or layer). Carbon is preferably vapor-deposited on the porous substrate. The vapor deposition of carbon may be performed with a commercially available deposition apparatus by any known technique, such as flash deposition. For even deposition of carbon on the porous substrate, the substrate is preferably rotated during vapor deposition of the carbon. Alternatively, the deposition of carbon on the porous substrate preferably involves application of a resin to the substrate and carbonization of the resin, more preferably involves application of a resin to the substrate, thermal curing of the resin, and carbonization of the resin. The resin may be of any type that can be carbonized. The resin is preferably, for example, a polyimide resin, a lignin resin, or a phenolic resin, particularly preferably a polyimide resin. The resin applied to the substrate is preferably in the form of a solution (e.g., a varnish). For even coating of the porous substrate with the resin, the resin solution is preferably applied to the substrate such that the solution does not permeate the substrate. Thus, spin coating is preferably used for very even deposition or application of the resin. The spin coating may be performed under any conditions; for example, a rotation rate of 1,000 to 10,000 rpm and an operational period of about 60 to 300 seconds (including dropwise addition and drying). The thermal curing of the resin preferably involves heating of the resin in air at 100 to 300° C. for 1 to 10 hours. The carbonization of the resin preferably involves heating of the resin under vacuum at 500 to 1,000° C. for 1 to 10 hours.

(3) Soaking in Aqueous Stock Solution

Subsequently, the porous substrate is soaked in an aqueous stock solution in a target direction (preferably horizontally or perpendicularly). To horizontally retain the porous substrate, the porous substrate may be hanged up in, suspended in or put on the bottom of a container of the aqueous stock solution. For example, the porous substrate may be immobilized and suspended in the stock solution and away from the bottom of the solution container. To perpendicularly retain the porous substrate, a fixture may be disposed that can holds the porous substrate perpendicularly to the bottom of the solution container. In each embodiment, a preferred configuration or arrangement is one that forms LDH substantially perpendicular (i.e., grows platy LDH particles oriented in such a manner that the tabular faces of the platy particles are substantially perpendicular to or oblique to the surface of the porous substrate) over, on and/or in the porous substrate. The aqueous stock solution contains magnesium ions ($Mg^{2+}$) and aluminum ions ($Al^{3+}$) in a certain total concentration and urea. Urea is hydrolyzed into ammonia and raises the pH of the aqueous stock solution, and metal ions co-existing in the aqueous stock solution are converted into hydroxides, whereby LDH is formed. The urea hydrolysis, which also generates carbon dioxide, can form LDH having carbonate ions as anions. The aqueous stock solution contains magnesium ions ($Mg^{2+}$) and aluminum ions ($Al^{3+}$) in a total concentration of preferably 0.20 to 0.40 mol/L, more preferably 0.22 to 0.38 mol/L, further more preferably 0.24 to 0.36 mol/L, and most preferably 0.26 to 0.34 mol/L. These concentration ranges facilitate the nucleation and the crystal growth in a balanced manner and can form a highly-oriented high-density LDH-containing functional layer. At a low total concentration of magnesium ions and aluminum ions, the crystal growth dominates over the nucleation, resulted in a decrease in the number of the LDH particles and an increase in the size of the LDH particles. At a high total concentration, the nucleation dominates over the crystal growth, resulted in an increase in the number of the LDH particles and a decrease in the size of the LDH particles.

The aqueous stock solution preferably contains dissolved magnesium nitrate and aluminum nitrate, and the aqueous stock solution thereby contains nitrate ions in addition to the magnesium ions and the aluminum ions. In this case, a molar ratio of the urea to the nitrate ions ($NO_3^-$) (i.e., urea/$NO_3^-$) in the aqueous stock solution ranges preferably from 2 to 6, and more preferably from 4 to 5.

(4) Formation of LDH-Containing Functional Layer by Hydrothermal Treatment

In the next stage, hydrothermal treatment of the porous substrate is performed in the aqueous stock solution to form the LDH-containing functional layer on and/or in the porous substrate. The hydrothermal treatment is performed in a sealed container at a temperature of preferably 60 to 150° C., more preferably 65 to 120° C., further more preferably 65 to 100° C., and most preferably 70 to 90° C. The hydrothermal treatment temperature may have any upper limit within the scope not causing thermal deformation of the porous substrate (e.g., the polymer substrate). The temperature can be raised at any rate in the hydrothermal treatment. The heating rate may range from 10 to 200° C./h, preferably from 100 to 200° C./h, and more preferably from 100 to 150° C./h. The time for the hydrothermal treatment may be determined depending on a target density and a target thickness of the LDH-containing functional layer.

After the hydrothermal treatment, the porous substrate is taken out from the sealed container, and then preferably cleaned with ion-exchanged water.

The resulting LDH-containing functional layer of the LDH-containing composite material is composed of densely assembled platy LDH particles that are oriented in the substantially perpendicular direction, which direction is beneficial for the conductivity. In the case of using the LDH-containing functional layer that is dense and has sufficient gas-tight property in batteries, such as zinc-air batteries, the electricity generating capacity will increase. Furthermore, this dense LDH-containing functional layer is expected to be applicable to novel applications, such as a separator that can prevent zinc dendrite growth and carbon dioxide incorporation, which have been large technical barriers against forming a zinc-air secondary battery containing an electrolyte solution that has not been achieved. This dense LDH-containing functional layer can also be used in a separator of a nickel-zinc battery which has been known to cause growth of zinc dendrite growth being an obstacle for practical use of this battery.

The LDH-containing functional layers can be formed on and/or in both surfaces of the porous substrate by the above-described method. To produce the LDH-containing composite material in a shape suitable for a separator, machine grinding of a LDH-containing functional layer on one surface of the porous substrate is preferably performed after the formation of the LDH-containing functional layers. Alternatively, it is desirable to take a measure so that the LDH-containing functional layer cannot be formed on one surface of the porous substrate.

EXAMPLES

Oriented layered double hydroxide membranes were formed on porous substrates in Examples described below. The membrane samples prepared in the Examples were evaluated as follows.

Evaluation 1: Identification of Membrane Sample

A crystalline phase of a membrane sample is analyzed with an X-ray diffractometer (RINT-TTR III, manufactured by Rigaku Corporation) at a voltage of 50 kV, a current of 300 mA, and a measuring range of 10° to 70°. The resultant XRD profile is compared with the diffraction peaks of a layered double hydroxide (or a hydrotalcite compound) described in JCPDS card No. 35-0964 for identification of the membrane sample.

Evaluation 2: Observation of Microstructure

The surface microstructure of the membrane sample was observed with a scanning electron microscope (SEM; JSM-6610LV, manufactured by JEOL Ltd.) at an acceleration voltage of 10 to 20 kV.

Evaluation 3: Evaluation of Density I

Figure 4A:
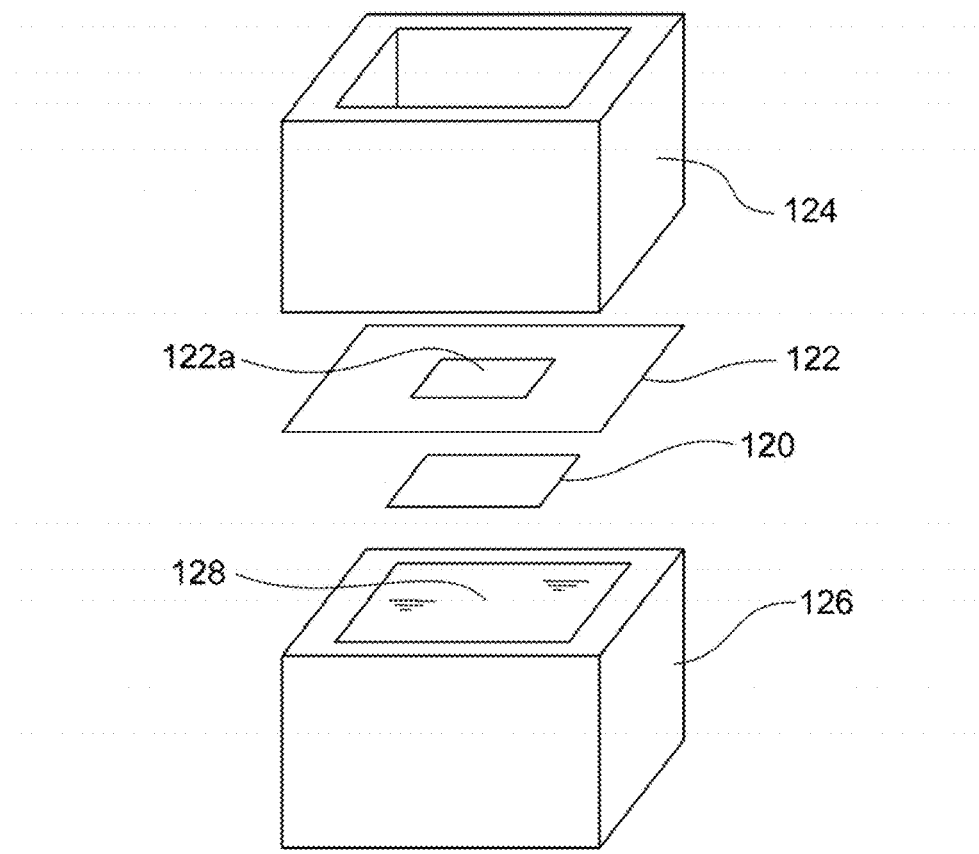
FIG. 4A is an exploded perspective view of a system for evaluating and measuring density used in density evaluation test I in Examples 1 and 2.
Figure 4B:
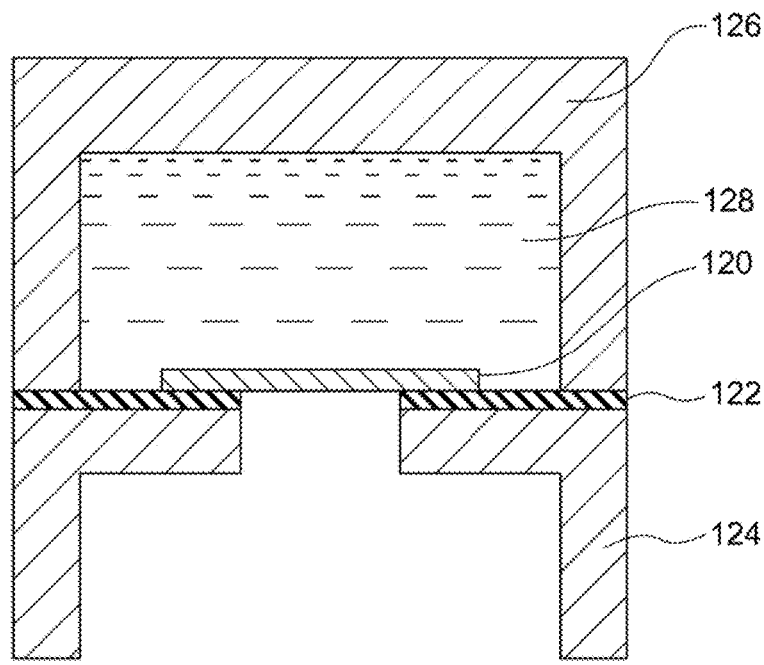
FIG. 4B a schematic cross-sectional view of a system for evaluating and measuring density used in density evaluation test I in Examples 1 and 2.

A density evaluation test was performed on the membrane sample for determining whether the sample has high density and thus water impermeability. With reference to FIG. 4A, a silicone rubber 122 having a central opening 122a (0.5 cm×0.5 cm) was bonded to the membrane sample of LDH-containing composite material sample 120 (cut into a piece of 1 cm×1 cm), and the resultant laminate was disposed between two acrylic units 124 and 126 and bonded to these acrylic units. The acrylic unit 124 disposed on the silicone rubber 122 has no bottom, and thus the silicone rubber 122 is bonded to the acrylic unit 124 such that the opening 122a is exposed. The acrylic unit 126 disposed on the porous substrate side in view of composite material sample 120 has a bottom and contains ion-exchange water 128. In this case, Al and/or Mg may be dissolved in the ion-exchange water. Thus, these components are arranged to form an assembly such that the ion-exchange water 128 comes into contact with the porous substrate of composite material sample 120 if the assembly is inverted upside down. It goes without saying that the unit 126 has a closed vent (not shown) and the vent is opened after inversion of the assembly. As illustrated in FIG. 4B, the assembly was inverted and left for one week at 25° C., and then the total weight thereof was measured again. Before measurement of the weight of the assembly, water droplets on the inner side(s) of the acrylic unit 124 were wiped off, if any. The density of the membrane sample was evaluated on the basis of the difference between the total weights of the assembly before and after the inversion. When no change in weight of the ion-exchange water is observed even after the one-week test at 25° C., the membrane sample (i.e., functional membrane) was evaluated as having high density so as to exhibit water impermeability.

Evaluation 4: Evaluation of Density II

Figure 5A:
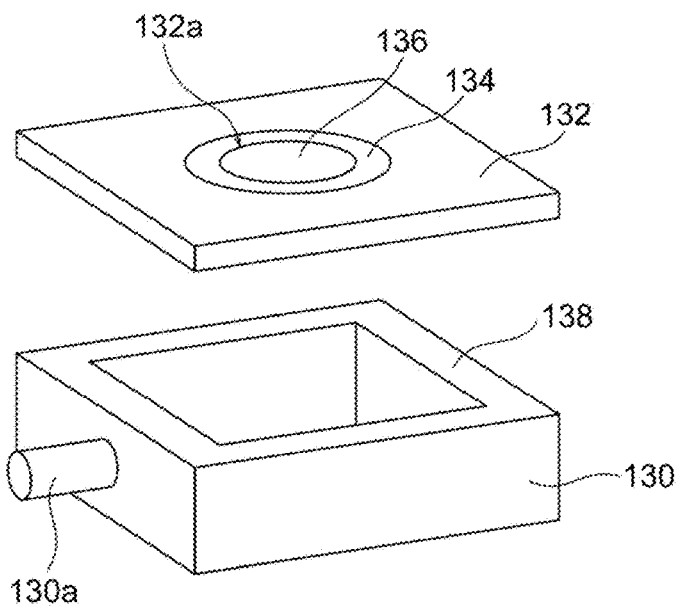
FIG. 5A is an exploded perspective view of a hermetic container used in density evaluation test II in Examples 1 and 2.
Figure 5B:
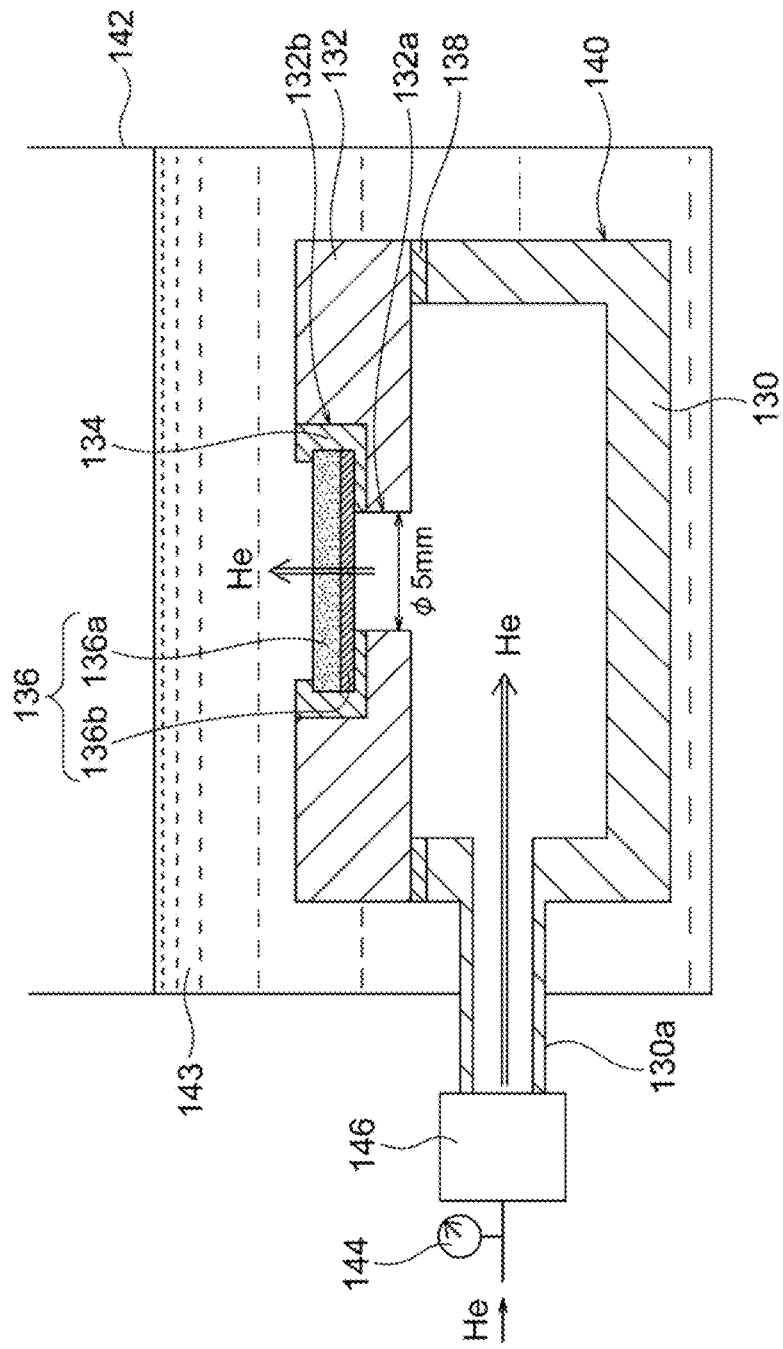
FIG. 5B is a schematic cross-sectional view of a system used in density evaluation test II in Examples 1 and 2.

A density evaluation test was performed on the membrane sample for determining whether the sample has high density and thus gas impermeability. As illustrated in FIGS. 5A and 5B, an acrylic container 130 and an alumina jig 132 were provided. The container 130 has no lid, and the jig 132 has a shape and a size such that it serves as a lid for the container 130. The acrylic container 130 has a gas inlet 130a for feeding a gas into the container 130. The alumina jig 132 has an opening 132a having a diameter of 5 mm, and a dent 132b provided around the opening 132a for supporting the membrane sample. An epoxy adhesive 134 was applied to the dent 132b of the alumina jig 132, and a membrane sample 136b of a composite material sample 136 was placed on the dent 132b and gas- and liquid-tightly bonded to the alumina jig 132. The alumina jig 132 provided with the composite material sample 136 was gas- and liquid-tightly bonded to the upper edge of the acrylic container 130 with a silicone adhesive 138 so as to completely cover the opening of the acrylic container 130, to prepare a hermetic container 140 for evaluation. The hermetic container 140 was placed in a water bath 142, and the gas inlet 130a of the acrylic container 130 was connected to a pressure gauge 144 and a flowmeter 146 so as to allow helium gas to be fed into the acrylic container 130. Water 143 was poured into the water bath 142 such that the hermetic container 140 was completely submerged in the water. The hermetic container 140 was ensured to have gas tightness and liquid tightness. The membrane sample 136b of the composite material sample 136 was exposed to the inner space of the hermetic container 140, and the porous substrate 136a of the composite material sample 136 was in contact with the water in the water bath 142. Helium gas was fed into the hermetic container 140 through the gas inlet 130a of the acrylic container 130. The pressure gauge 144 and the flowmeter 146 were monitored to achieve a differential pressure of 0.5 atm at the membrane sample 136b (i.e., the pressure applied to the surface in contact with helium gas was higher by 0.5 atm than water pressure applied to the opposite surface), to determine the presence of helium gas bubbles in the water caused by permeation of helium gas through the composite material sample 136. When no helium gas bubbles were observed, the membrane sample 136b was evaluated as having high density so as to exhibit gas impermeability.

Evaluation 5: Determination of Sulfur Content

A cross section of a composite material sample (including an LDH membrane and a porous substrate) was polished with a cross section polisher (CP) for observation of the polished surface. Cross-sectional images of the composite material sample were observed with an FE-SEM (ULTRA55, manufactured by Carl Zeiss) at a magnification of 15,000 or more (three visual fields). Compositional analysis (point analysis) was performed at any three points at the interface between the LDH membrane and the porous substrate of each of the three visual-field images (i.e., nine points in total) with an EDS analyzer (NORAN System SIX, manufactured by Thermo Fisher Scientific Inc.) (accelerating voltage: 10 kV, acquisition time: 100 seconds). The S content (atom %) at each point was determined by the compositional analysis, and the S contents at the nine points were averaged. The average value was defined as the S content at the interface.

Evaluation 6: Determination of Conductivity

Figure 6:
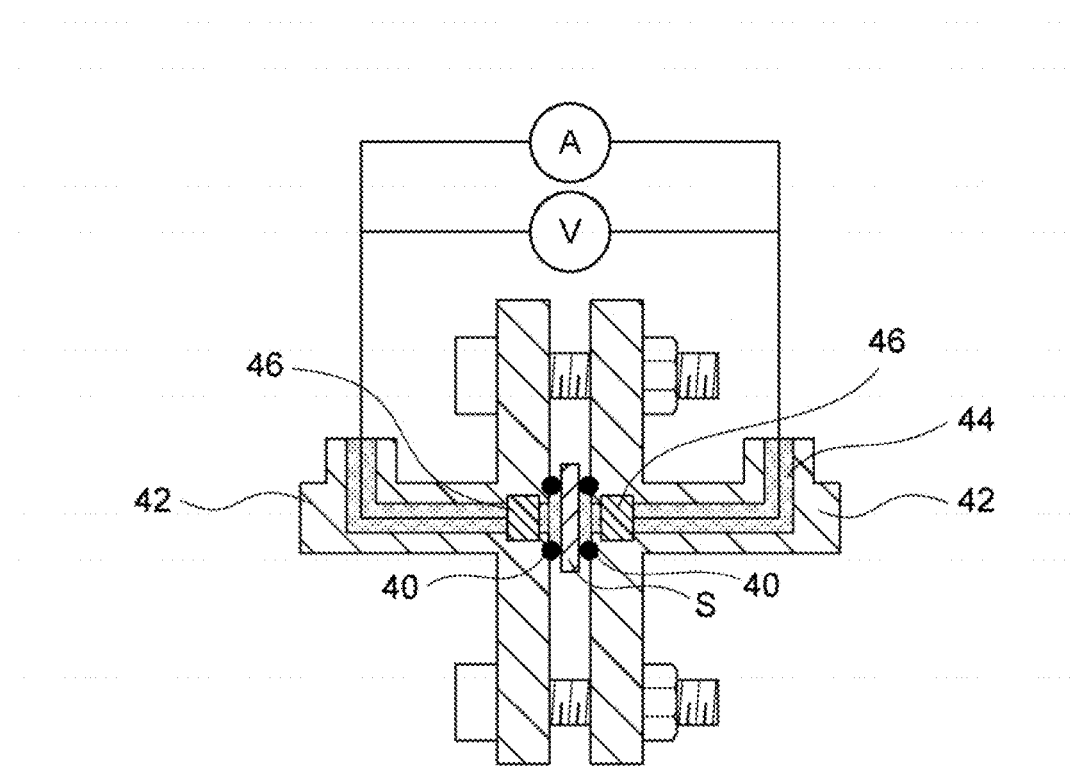
FIG. 6 is a schematic cross-sectional view of an electrochemical measuring system used in Examples 1 and 2.

The conductivity of a membrane sample in an electrolytic solution was determined with an electrochemical measuring system illustrated in FIG. 6 as follows. A composite material sample S (a porous substrate provided with an LDH membrane) was sandwiched between silicone packings 40 (thickness: 1 mm each) and placed in a PTFE flange cell 42 having an inner diameter of 6 mm. Electrodes 46 (cylindrical electrodes composed of #100-mesh nickel netting and having a diameter of 6 mm) were placed in the cell 42 such that the distance between the electrodes was 2.2 mm. The cell 42 was filled with an electrolytic solution 44 (6M aqueous KOH solution). The resistance of the composite material sample (the porous substrate provided with the LDH membrane) was determined with an electrochemical measuring system (potentio/galvanostat-frequency response analyzer, Model Nos. 1287A and 1255B, manufactured by Solartron) at a frequency of 1 MHz to 0.1 Hz and a voltage of 10 mV. The intercept on the real axis was defined as the resistance of the sample. The resistance of a porous substrate having no LDH membrane was also determined as described above. The difference between the resistance of the composite material sample S (the porous substrate provided with the LDH membrane) and that of the substrate was defined as the resistance of the LDH membrane. The conductivity of the LDH membrane was calculated from the resistance, thickness, and area of the LDH membrane.

Evaluation 7: Determination of Carbon Content at Interface

A cross section of a composite material sample (including an LDH membrane and a porous substrate) was polished with a cross section polisher (CP) for observation of the polished surface. A cross-sectional image of the composite material sample (including the LDH membrane and the porous substrate) was observed with an FE-SEM (ULTRA55, manufactured by Carl Zeiss) at a magnification of 10,000 (refer to, for example, the image illustrated in FIG. 12). The image was analyzed with an EDS analyzer (NORAN System SIX, manufactured by Thermo Fisher Scientific Inc.) (accelerating voltage: 5 kV) to acquire a line profile of carbon concentration (i.e., carbon (C) atom concentration (atom %)) across the interface between the LDH membrane and the porous substrate at a pitch of 0.06 µm over a length of 3 µm from the LDH membrane toward the porous substrate as shown by the dotted arrow in FIG. 12. The resultant line profile of carbon concentration was used to determine the presence of the maximum carbon content at the interface and in the vicinity thereof. Since the maximum carbon content at the interface and in the vicinity thereof is apparently not affected by inevitable intrusion of carbon due to contamination with, for example, external air during the analysis, the presence of the maximum carbon content is the objective evidence for the presence of carbon (C) at the interface and in the vicinity thereof.

Example 1

(1) Preparation of Porous Substrate

Zirconia (8YSZ) powder (TZ-8YS, $Y_2O_3$: 8 mol %, manufactured by Tosoh Corporation), methyl cellulose, and ion-exchange water were weighed in proportions by mass of 10:1:5, and were then kneaded together. The kneaded product was subjected to extrusion molding with a hand press into a size of 2.5 cm×10 cm×0.5 cm in thickness. The resultant green body was dried at 80° C. for 12 hours and then fired at 1,100° C. for three hours. The resultant product was processed into a zirconia (8YSZ) porous substrate having dimensions of 2.0 cm by 2.0 cm by 0.3 cm (thickness).

The porosity at the surface of the resultant porous substrate was determined by a method involving image processing. The porosity was 42.5%. The porosity was determined as follows: 1) a scanning electron microscopic (SEM) image of the surface microstructure of the porous substrate was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 6 µm×6 µm area of the surface of the porous substrate.

The average pore size of the porous substrate was about 0.22 In the present invention, the average pore size was determined by measuring the largest length of each pore in a scanning electron microscopic (SEM) image of the surface of the porous substrate. The magnification of the scanning electron microscopic (SEM) image used in this measurement was 20,000. All the measured pore sizes were listed in order of size to calculate the average, from which the subsequent 15 larger sizes and the subsequent 15 smaller sizes, i.e., 30 sizes in total, were selected in one field of view. The selected sizes of two fields of view were then averaged to yield the average pore size. The pore sizes were measured by, for example, a length-measuring function of SEM software.

The resultant porous substrate was ultrasonically cleaned in acetone for five minutes, in ethanol for two minutes, and then in ion-exchange water for one minute.

(2) Spin-Coating with Polystyrene and Sulfonation

A polystyrene substrate (0.6 g) was dissolved in xylene (10 mL) to prepare a coating solution having a polystyrene concentration of 0.06 g/mL. The coating solution (0.1 mL) was added dropwise and applied to the 8YSZ porous substrate by a spin coating process at 8,000 rpm for 200 seconds (including dropwise addition and drying). The spin-coated porous substrate was sulfonated through immersion in 95% sulfuric acid at 25° C. for four days.

(3) Preparation of Aqueous Stock Solution

Magnesium nitrate hexahydrate ($Mg(NO_3)_2 \cdot 6H_2O$, manufactured by KANTO CHEMICAL Co., Inc.), aluminum nitrate nonahydrate ($Al(NO_3)_3 \cdot 9H_2O$, manufactured by KANTO CHEMICAL Co., Inc.), and urea (($NH_2)_2CO$, manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 75 mL, a ratio of the cations ($Mg^{2+}/Al^{3+}$) of 2, and a molar concentration of the total metal ions (i.e., $Mg^{2+}$ and $Al^{3+}$) of 0.320 mol/L. The resultant solution was agitated and urea was then added to the solution. The added urea was weighed in advance to give a urea/$NO_3^-$ ratio of 4. The resultant solution was further agitated to prepare an aqueous stock solution.

(4) Formation of Membrane by Hydrothermal Treatment

The aqueous stock solution prepared in the above procedure (3) and the porous substrate sulfonated in the above procedure (2) were enclosed together in a hermetic Teflon (registered trademark) container (with an internal volume of 100 mL and a stainless steel jacket). The porous substrate was horizontally suspended and away from the bottom of the hermetic Teflon (registered trademark) container such that the opposite surfaces of the porous substrate came into contact with the aqueous stock solution. Thereafter, the porous substrate was subjected to hydrothermal treatment at a hydrothermal temperature of 70° C. for 168 hours (7 days) to form oriented layered double hydroxide membranes (functional layers) on the surfaces of the substrate. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane sample"). The thickness of the membrane sample was about 1.5 µm. A layered-double-hydroxide-containing composite material sample (hereinafter referred to as "composite material samples") was thereby prepared. LDH membranes were formed on the opposite surfaces of the porous substrate. In order to use the composite material as a separator, the LDH membrane on one surface of the porous substrate was mechanically removed.

(5) Results of Evaluation

The resultant LDH membrane sample was evaluated. The results of evaluations 1 to 7 are described below.

Evaluation 1: The membrane sample was identified as an LDH (hydrotalcite compound) on the basis of the XRD profile.

Figure 7:
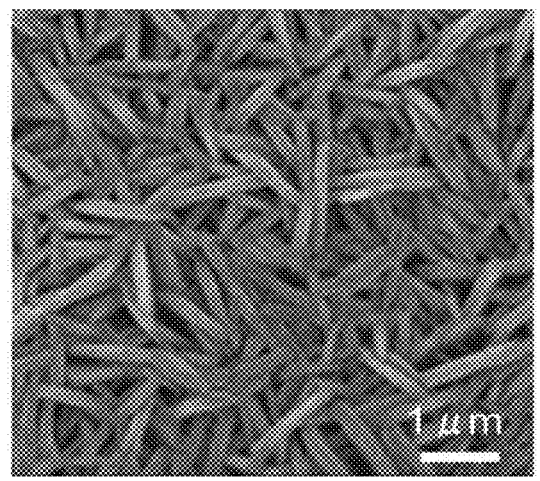
FIG. 7 is a SEM image of a surface microstructure of a sample observed in Example 1.

Evaluation 2: A SEM image of a surface microstructure of the membrane sample is illustrated in FIG. 7. As illustrated in FIG. 7, the porous substrate is not exposed through the LDH membrane; i.e., the LDH membrane is evenly formed over the surface of the porous substrate.

Evaluation 3: The membrane sample was determined to have sufficiently high density to exhibit water impermeability.

Evaluation 4: The membrane sample was determined to have sufficiently high density to exhibit gas impermeability.

Figure 8:
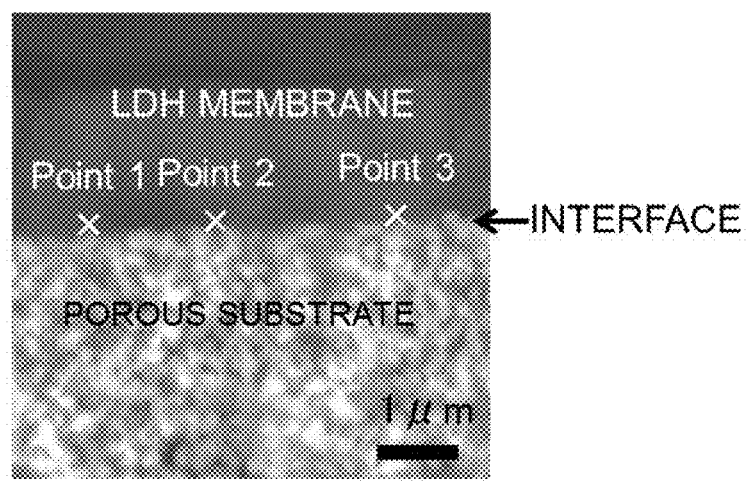
FIG. 8 is an FE-SEM image of a region in the vicinity of the interface between the LDH membrane and the porous substrate of the sample observed in Example 1.
Figure 9:
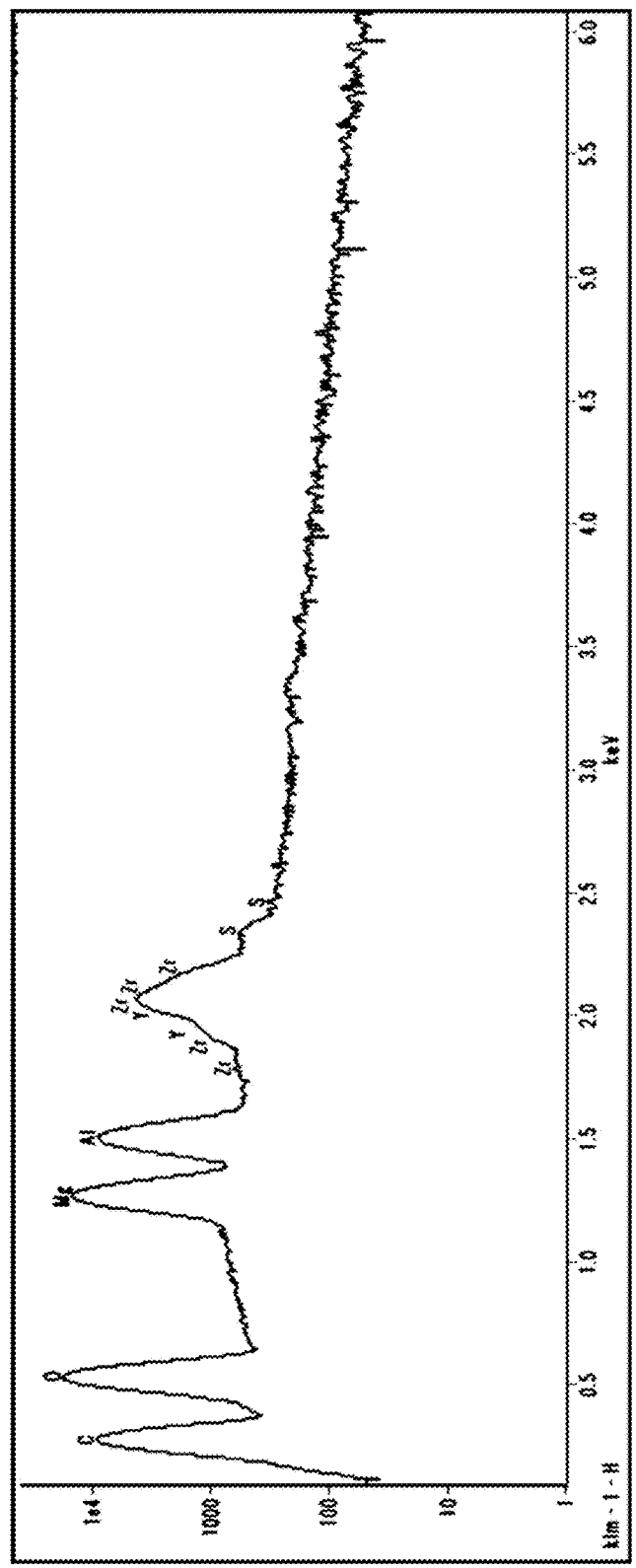
FIG. 9 is an EDS spectrum of the sample of Example 1 obtained at point 1 shown in FIG. 8.

Evaluation 5: The membrane sample had an S content of 0.6% at the interface between the membrane sample and the porous substrate. FIG. 8 is an FE-SEM image of a region in the vicinity of the interface between the LDH membrane and the porous substrate in a visual field for determination of the S content (FIG. 8 shows three points at which the compositional analysis was performed). FIG. 9 is an EDS spectrum at point 1 illustrated in FIG. 8 for determination of the S content.

Evaluation 6: The membrane sample had a conductivity of 2 mS/cm.

Evaluation 7: No maximum carbon content was determined at the interface and in the vicinity thereof.

Example 2

(Comparative)

An 8YSZ porous substrate was prepared and cleaned as in Example 1 (1). The 8YSZ porous substrate was placed in an autoclave. An LDH membrane was formed and evaluated as in Example 1 (3) and (4), except that i) neither polystyrene spin coating nor sulfonation (the aforementioned procedure (2)) was performed, and ii) $Al(OH)_3$ was nucleated on the surface of the substrate through hydrothermal treatment at 60° C. for four days in the same aqueous stock solution before the seven-day hydrothermal treatment at 70° C. In detail, $Al(OH)_3$ was formed on the surface of the porous substrate through hydrothermal treatment in the autoclave containing the aqueous stock solution and the porous substrate at 60° C. for four days, followed by hydrothermal treatment in the same aqueous stock solution at 70° C. for seven days, to form an LDH membrane.

The resultant LDH membrane sample was evaluated. The results of evaluations 1 to 7 are described below.

Evaluation 1: The membrane sample was identified as an LDH (hydrotalcite compound) on the basis of the XRD profile.

Figure 10:
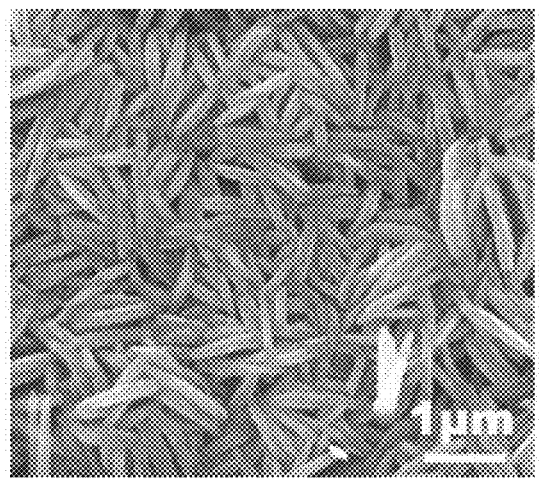
FIG. 10 is a SEM image of a surface microstructure of a sample observed in Example 2.

Evaluation 2: A SEM image of a surface microstructure of the membrane sample is illustrated in FIG. 10. As illustrated in FIG. 10, the porous substrate is not exposed through the LDH membrane; i.e., the LDH membrane is evenly formed over the surface of the porous substrate.

Evaluation 3: The membrane sample was determined to have sufficiently high density to exhibit water impermeability.

Evaluation 4: The membrane sample was determined to have sufficiently high density to exhibit gas impermeability.

Evaluation 5: The membrane sample had an S content of 0% at the interface between the membrane sample and the porous substrate.

Evaluation 6: The membrane sample had a conductivity of 0.3 mS/cm.

Evaluation 7: No maximum carbon content was determined at the interface and in the vicinity thereof.

Example 3

Carbon Deposition (Vapor Deposition) and Sulfonation

An 8YSZ porous substrate was prepared and cleaned as in Example A1 (1). The surface of the porous substrate had a porosity of 42.5%, and the porous substrate had an average pore size of about 0.22 The 8YSZ porous substrate was evenly coated (vapor-deposited) with carbon while the substrate was rotated. The carbon coating was performed by a flash deposition process (five flash operations) with a vacuum deposition apparatus (SVC-700TMSG, manufactured by Sanyu Electron Co., Ltd., optionally equipped with a flash power supply for carbon vapor deposition). The carbon-coated substrate was immersed in 95% sulfuric acid at 80° C. for seven days to bond sulfone groups to the carbon. The sulfonated porous substrate was placed in an autoclave and an LDH membrane was formed as in Example 1 (3) and (4).

The resultant LDH membrane sample was evaluated. The results of evaluations 1 to 7 are described below.

Evaluation 1: The membrane sample was identified as an LDH (hydrotalcite compound) on the basis of the XRD profile.

Figure 11:
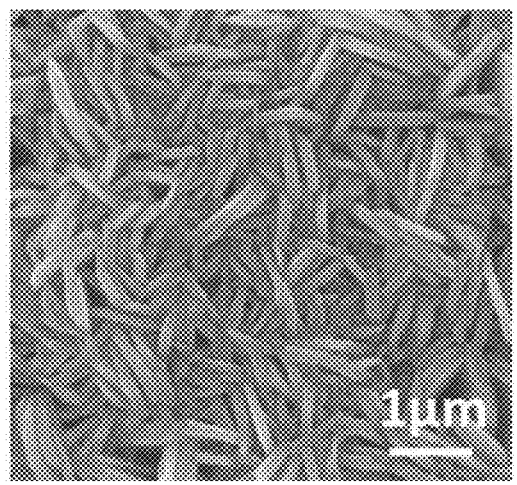
FIG. 11 is a SEM image of a surface microstructure of a sample observed in Example 3.

Evaluation 2: A SEM image of a surface microstructure of the membrane sample is illustrated in FIG. 11. As illustrated in FIG. 11, the porous substrate is not exposed through the LDH membrane; i.e., the LDH membrane is evenly formed over the surface of the porous substrate.

Evaluation 3: The membrane sample was determined to have sufficiently high density to exhibit water impermeability.

Evaluation 4: The membrane sample was determined to have sufficiently high density to exhibit gas impermeability.

Evaluation 5: The membrane sample had an S content of 0.5% at the interface between the membrane sample and the porous substrate.

Evaluation 6: The membrane sample had a conductivity of 3.2 mS/cm, which was higher than that of the membrane sample of Example 1.

Figure 12:
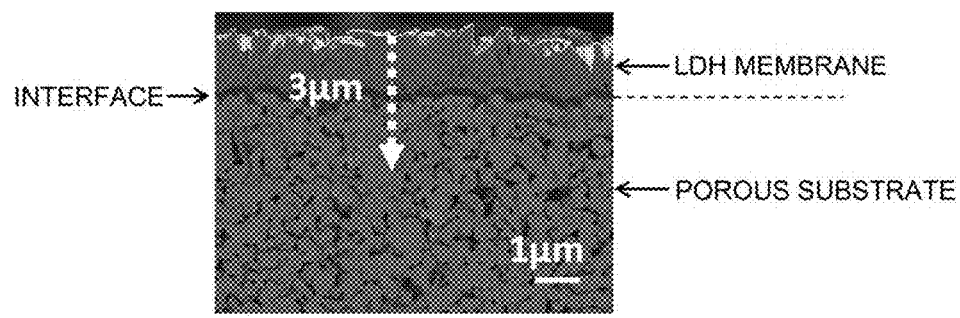
FIG. 12 is an FE-SEM image of a region in the vicinity of the interface between the LDH membrane and the porous substrate of the sample observed in Example 3.
Figure 13:
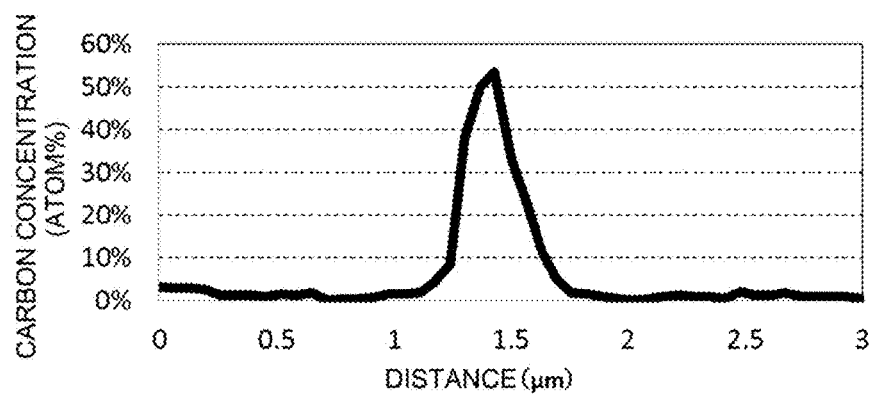
FIG. 13 is a line profile of carbon concentration at the interface between the LDH membrane and the porous substrate and in the vicinity of the interface determined by EDS analysis over a length of 3 µm as shown by the dotted arrow in FIG. 12 in Example 3.

Evaluation 7: FIG. 12 is an FE-SEM image of a region in the vicinity of the interface between the LDH membrane and the porous substrate. FIG. 13 is a line profile of carbon concentration at the interface between the LDH membrane and the porous substrate and in the vicinity of the interface determined in Example 3 over a length of 3 µm as shown by the dotted arrow in FIG. 12. As illustrated in FIGS. 12 and 13, the maximum carbon content was determined (i.e., the presence of carbon (C) was determined) at the interface and in the vicinity thereof (particularly at the interface). This suggested the presence of a carbon membrane or layer at the interface.

What is claimed is:

1. A layered-double-hydroxide-containing composite material comprising:
    a porous substrate; and
    a functional layer on and/or in the porous substrate, the functional layer containing a layered double hydroxide represented by general formula $M^{2+}_{1-x}M^{3+}_{x}(OH)_2 A^{n-}_{x/n} \cdot mH_2O$, where $M^{2+}$ represents a divalent cation, $M^{3+}$ represents a trivalent cation, $A^{n-}$ represents an n-valent anion, n represents an integer not less than 1, x represents a value of 0.1 to 0.4, and m represents any real number, and the functional layer further containing sulfur (S) at the interface between the functional layer and the porous substrate and in the vicinity of the interface,
    wherein the functional layer has water impermeability, and
    wherein the sulfur content at the interface between the functional layer and the porous substrate and in the vicinity of the interface is 0.01 atom % to 5.0 atom %.

2. The layered-double-hydroxide-containing composite material according to claim 1, wherein the functional layer further contains carbon (C) at the interface between the functional layer and the porous substrate and in the vicinity of the interface.

3. The layered-double-hydroxide-containing composite material according to claim 1, wherein the layered double hydroxide is an agglomeration of platy particles, and the platy particles are oriented in such a manner that the tabular faces of the platy particles are substantially perpendicular to or oblique to the surface of the porous substrate.

4. The layered-double-hydroxide-containing composite material according to claim 1, wherein in the general formula, $M^{2+}$ comprises $Mg^{2+}$, $M^{3+}$ comprises $Al^{3+}$, and $A^{n-}$ comprises $OH^-$ and/or $CO_3^{2-}$.

5. The layered-double-hydroxide-containing composite material according to claim 1, wherein the functional layer is formed on the porous substrate.

6. The layered-double-hydroxide-containing composite material according to claim 1, wherein the functional layer has a thickness of not more than 100 µm.

7. The layered-double-hydroxide-containing composite material according to claim 1, wherein the porous substrate is composed of at least one selected from the group consisting of ceramics, metals and polymers.

8. The layered-double-hydroxide-containing composite material according to claim 7, wherein the porous substrate is composed of a ceramic, and the ceramic is at least one selected from the group consisting of alumina, zirconia, titania, magnesia, spinel, calcia, cordierite, zeolite, mullite, ferrite, zinc oxide, and silicon carbide.

9. The layered-double-hydroxide-containing composite material according to claim 1, wherein the porous substrate has an average pore diameter of 0.001 µm to 1.5 µm.

10. The layered-double-hydroxide-containing composite material according to claim 1, wherein the surface of the porous substrate has a porosity of 10% to 60%.

11. A battery comprising a separator comprising the layered-double-hydroxide-containing composite material according to claim 1.

* * * * *